(12) United States Patent
Kornelsen et al.

(10) Patent No.: US 10,753,816 B2
(45) Date of Patent: Aug. 25, 2020

(54) CALIBRATION-LESS MICRO-FABRICATED VACUUM GAUGE DEVICES AND METHOD FOR MEASURING PRESSURE

(71) Applicants: Kevin Kornelsen, Bromont (CA); Pascal Newby, Brossard (CA); Cedric Spits, Sherbrooke (CA); Luc Frechette, Sherbrooke (CA)

(72) Inventors: Kevin Kornelsen, Bromont (CA); Pascal Newby, Brossard (CA); Cedric Spits, Sherbrooke (CA); Luc Frechette, Sherbrooke (CA)

( * ) Notice: Subject to any disclaimer, the term of this patent is extended or adjusted under 35 U.S.C. 154(b) by 259 days.

(21) Appl. No.: 16/001,363

(22) Filed: Jun. 6, 2018

(65) Prior Publication Data

US 2018/0364127 A1 Dec. 20, 2018

Related U.S. Application Data

(60) Provisional application No. 62/520,160, filed on Jun. 15, 2017.

(51) Int. Cl.
*G01L 21/12* (2006.01)
*G01L 21/14* (2006.01)

(52) U.S. Cl.
CPC .............. *G01L 21/12* (2013.01); *G01L 21/14* (2013.01)

(58) Field of Classification Search
CPC .................................. G01L 21/12; G01L 21/14
See application file for complete search history.

(56) References Cited

U.S. PATENT DOCUMENTS

| | | | | |
|---|---|---|---|---|
| 10,008,373 | B1* | 6/2018 | Carr | G01R 33/0035 |
| 2007/0109091 | A1* | 5/2007 | Landsberger | H01C 17/232 338/25 |
| 2010/0327279 | A1* | 12/2010 | Kimata | G01L 21/12 257/48 |
| 2011/0174079 | A1* | 7/2011 | Manohara | G01L 21/12 73/753 |
| 2011/0231117 | A1* | 9/2011 | Cardinale | G01L 27/007 702/53 |
| 2013/0092243 | A1* | 4/2013 | Mohammed | G01F 25/0053 137/2 |
| 2014/0216127 | A1* | 8/2014 | Kimura | G01L 21/14 73/1.57 |
| 2015/0276536 | A1* | 10/2015 | Gu | G01L 21/10 73/755 |

\* cited by examiner

*Primary Examiner* — Francis C Gray

(57) ABSTRACT

A manner to determine pressure (e.g. inside a vacuum package, such as a MEMS die), without prior calibration, is provided using a model and a set of one or more gauges (e.g. Pirani, thermistor, thermocouple gauges) with distinct geometries. In order to calculate pressure from the electrical measurements performed on the gauges, there are several intermediate steps and an analytical model describes each of these steps. Besides the electrical measurements, other inputs are required, such as material properties and certain dimensions, which may not be known accurately. Several different gauge geometries are proposed which can be combined in order to determine the vacuum (pressure) level without knowing the values of these inputs beforehand.

23 Claims, 4 Drawing Sheets

CALIBRATION-LESS MICRO-FABRICATED VACUUM GAUGE DEVICES AND METHOD FOR MEASURING PRESSURE

CROSS-REFERENCE TO RELATED APPLICATIONS

This application claims the benefit of U.S. Provisional Patent Application No. 62/520,160 filed Jun. 15, 2017, the contents of which are incorporated herein by reference.

FIELD

The present disclosure relates to micro-fabricated sensors such as thermal conductivity vacuum (pressure) gauges and to micro-fabricated devices such as vacuum packages including such gauges and more particularly to measuring pressure using micro-fabricated pressure gauges in a calibration-less manner.

BACKGROUND

Vacuum gauges generally need to be calibrated against pressure. Traditionally, vacuum gauges were used in vacuum chambers in which the pressure can easily be varied, but a new application for vacuum gauges is to integrate them on electronic chips or micro-electro-mechanical systems (MEMS) which are enclosed in hermetic vacuum packages in order to monitor pressure. In this case pressure cannot be controlled, and calibration of vacuum gauges enclosed within vacuum packages (die-level or wafer-level) is challenging. One approach is to calibrate the vacuum gauge against pressure prior to packaging under vacuum, but the packaging process generally requires annealing of the device, which may change the properties of the materials of the vacuum gauge, thus rendering the calibration invalid. Calibration against pressure after packaging requires a destructive test, opening the package to vary the vacuum level. It is possible to calibrate a subset of gauges from a batch and use this calibration for all the other gauges in the batch, but variations in material properties make this approach inaccurate.

An alternative to calibration is to model the response of the gauge as a function of pressure, and to fit this model to the response of the gauge during operation in order to extract the pressure. This requires accurate knowledge of the material properties and dimensions of the gauge in order to predict its response. This may not be possible, especially when using micro-fabrication techniques, where within-wafer and wafer-to-wafer variations are common.

Thermal conductivity gauges are a well-known type of vacuum gauge and have been commercially available for several decades. More recently, micro-fabrication technology has been applied to the fabrication of miniaturized gauges, and there are several patents disclosing design and fabrication of this type of device: U.S. Pat. Nos. 4,682,503, 5,347,869, 5,557,972, 8,171,801 B2, 8,449,177 B2, 9,335,231 B2.

A large body of work has studied ways of improving design and operation of thermal conductivity gauges. Given that these gauges were traditionally used in vacuum chambers where pressure could easily be varied, there is little work on calibration methods. The most widely studied topic is compensation of the effect of ambient temperature variations, for example U.S. Pat. Nos. 6,023,979, 6,474,172, 6,658,941 B1, 7,249,516, 7,331,237 B2.

U.S. Pat. No. 8,504,313 proposes a method of calibration where calibration against pressure is replaced by calibration of temperature. However, this method still requires exposure to atmospheric pressure, so is not adapted to micro-fabricated thermal conductivity vacuum gauges packaged inside closed dies.

U.S. Pat. No. 7,385,199 B2 discloses a method for using an infrared bolometer pixel as a thermal-conductivity vacuum gauge. A detailed calibration strategy is also described, but again requires calibration against pressure.

U.S. Pat. No. 8,171,801 B2 presents a micro-fabricated thermistor gauge and an operation method, whereby the voltage response of the gauge is measured at two different temperatures. This method is designed to suppress the effect of certain parameters, such as ambient temperature variations, but requires the voltage difference between the two temperatures to be calibrated against pressure.

A large number of scientific articles have been published on the topic of micro-fabricated thermal conductivity gauges. Several articles present gauges which are packaged inside sealed dies, but the gauges are either calibrated before packaging, or a hole is made in the package to measure its pressure response. These articles include:

J. Mitchell, G. R. Lahiji, and K. Najafi, "An Improved Performance Poly-Si Pirani Vacuum Gauge Using Heat-Distributing Structural Supports," *J. Microelectromech. Syst.*, vol. 17, no. 1, pp. 93-102, February 2008.

Junseok Chae, J. M. Giachino, and K. Najafi, "Fabrication and Characterization of a Wafer-Level MEMS Vacuum Package With Vertical Feedthroughs," *J. Microelectromech. Syst.*, vol. 17, no. 1, pp. 193-200, February 2008.

L. Zhang, B. Jiao, S. Yun, Y. Kong, C. Ku, and D.-P. Chen, "A CMOS Compatible MEMS Pirani Vacuum Gauge with Monocrystal Silicon," *Chinese Phys. Lett.*, vol. 34, no. 2, p. 25101, 2017.

R. Kuljic et al., "Microelectromechanical system-based vacuum gauge for measuring pressure and outgassing rates in miniaturized vacuum microelectronic devices," *J. Vac. Sci. Technol. B*, vol. 29, no. 2, p. 02B114, 2011.

Several articles have published useful models of the response of the gauges:

F. Völklein, M. Grau, A. Meier, G. Hemer, L. Breuer, and P. Woias, "Optimized MEMS Pirani sensor with increased pressure measurement sensitivity in the fine and high vacuum regime," *J. Vac. Sci. Technol. A*, vol. 31, no. 6, p. 61604, 2013.

C. H. Mastrangelo and R. S. Muller, "Microfabricated thermal absolute-pressure sensor with on-chip digital front-end processor," *IEEE J. Solid-State Circuits*, vol. 26, no. 12, pp. 1998-2007, 1991.

P. Eriksson, J. Y. Andersson, and G. Stemme, "Thermal characterization of surface-micromachined silicon nitride membranes for thermal infrared detectors," J. Microelectromech. Syst., vol. 6, no. 1, pp. 55-61, March 1997.

In summary, many patents and articles have been published on the subject of thermal conductivity gauges, and micro-fabricated gauges in particular. The topics of design, fabrication, and operation are well covered, but to our knowledge no work has been published which presents a calibration method which does not require calibration against pressure.

SUMMARY

This disclosure provides a manner to determine the pressure, for example, inside a vacuum package, such as a MEMS die, without prior calibration, using a model and a set of one or more embedded vacuum gauges with distinct geometries. In order to calculate pressure from the electrical measurements performed on the pressure gauges, there are several intermediate steps and an analytical model describes each of these steps. Besides the electrical measurements, other inputs are required, such as material properties and certain dimensions, which may not be known accurately. Several different gauge geometries are proposed which can be combined in order to determine the vacuum (pressure) level without knowing the values of these inputs beforehand.

There is provided A micro-fabricated device comprising: a substrate; and a plurality of pressure sensing gauges on said substrate. Each of the gauges comprises: a temperature sensing element comprising a resistive element or thermocouple junction that generates an output signal responsive to a temperature of the resistive element or thermocouple junction; and a support structure coupled to suspend the sensing element on the support platform above and in thermal isolation from the substrate. The sensing element has electrical connectivity to receive an electrical signal to heat, directly or indirectly, the sensing element to a temperature that is a function of a pressure level and to generate the output signal that is dependent upon the pressure level The support structure for each of the plurality of gauges is configured with a different geometry so that each gauge generates a different output signal in response to a same electrical signal when measuring the same pressure level in a same environment of the micro-fabricated device.

The support structure may comprises a support platform and support legs and wherein the different geometry comprises one of: varying a geometry of the support platform among each of the gauges while keeping the geometry of the support legs identical; and varying a geometry of the support legs among each of the gauges while keeping the geometry of the support platform identical.

The micro-fabricated device may comprise a component configured to receive each different output signal to define respective power-response curves and fit a model to the curves to extract a thermal conductance of the plurality of gauges and relate the thermal conductance to pressure to determine a pressure signal.

When the gauges comprise resistive elements, the each different output signal comprises a respective measure of total variable resistance for a respective gauge and each total variable resistance comprises measures of a leg resistance and a resistive element resistance; and the model uses each different output signal to separate the leg resistance and the resistive element resistance and determine a temperature that is responsive to the resistive element resistance.

For a temperature sensing element comprising a resistive element that generates an output signal measuring resistance, the model may determine an initial response ($R_0$) and temperature ($T_0$), at an ambient temperature in the absence of heating the sensing element, by extrapolating the power-response curves at zero power. The model may determine a change in temperature $\Delta T$ relative to $T_0$ in accordance with the equation:

$$\Delta T = \frac{1}{\frac{\alpha}{\ln\left(\frac{R_{SE}}{R_{SE,0}}\right)} - \frac{1}{T_0}}$$

where $R_{SE}$ is a measure of the sensing element output signal when heated, $R_{SE,0}$ is the initial sensing element response at $T_0$ and $\alpha$ is the temperature coefficient of resistance (TCR) of a material of the sensing element such as when the gauges output resistance.

The model may determine total thermal conductance as a function of a temperature of the sensing element and power dissipated in each gauge. The model may use the different output signals to separate a leg thermal conductance and a gas thermal conductance from the total thermal conductance and determine the pressure signal in response to the gas thermal conductance; wherein the leg thermal conductance is a measure of conductance through a leg portion of the support structure supporting the sensing element above the substrate; and wherein the gas thermal conductance is a measure of conductance through a gas around the sensing element of each gauge. The model may extrapolate a relationship between the total thermal conductance and a length of the leg portion of the support structure to determine thermal conductance in the absence of the leg portion.

The gauges may be configured to determine a level of vacuum in a vacuum package of the micro-fabricated device.

In another aspect there is provided a pressure determining device configured to: receive different output signals defining respective power-response curves; and fit a model to the curves to extract a thermal conductance of the plurality of gauges and relate the thermal conductance to determine a pressure signal. The different output signals are received from a plurality of temperature sensing gauges on a substrate of a micro-fabricated device, where each of the gauges comprises: a sensing element comprising a resistive element or thermocouple junction that generates an output signal responsive to a temperature of the resistive element or thermocouple junction which temperature is responsive to a pressure level; and a support structure coupled to suspend the sensing element on the support platform above and in thermal isolation from the substrate. The support structure for each of the plurality of gauges is configured with a different geometry so that each gauge generates a different output signal in response to a same electrical signal when measuring the same pressure in a same environment.

Features of the model for the pressure determining device are as described for the micro-fabricated device as set out herein above.

The pressure determining device may be one of a) separate processing device in communication with a micro-fabricated device comprising the substrate and plurality of gauges and b) a component of the micro-fabricated device.

In a another aspect there is provided a method for a processing component comprising: applying same electrical signals to several pressure gauges of a same gauge type co-located in a same micro-fabricated device, each gauge having a sensing element and a support structure supporting the sensing element, a geometry of the support structure varied among all of the several gauges so that each gauge generates a different output signal in response to a same pressure level in a same environment of the micro-fabricated device; receiving the different output signal of each of the gauges to define respective power-response curves; extracting from the curves a thermal conductance of the plurality of gauges; and relating the thermal conductance to pressure to determine a pressure signal.

Extracting in the method may comprise: determining an initial response measure $R_0$ at a temperature $T_0$ of the gauges by extrapolating the power-response curves at zero power, where $T_0$ is an ambient temperature in the absence of power heating the gauges; determining a response measure of the gauges after heating by the electrical signals, each response measure including a) a response measure component from a resistive element or thermocouple junction of the sensing element and b) a response measure component from the support structure; determining a measure of change in temperature ΔT relative to $T_0$ and a measure of power dissipated in the gauge, separating and converting the response measure component from the resistive element or thermocouple junction to determine the ΔT; determining total thermal conductance as a function of dissipated power where total thermal conductance includes a) a first thermal conductance component responsive to conductance through a legs component of the support structure of the gauge and b) a second thermal conductance component responsive to conductance through a gas around the gauge; and determining a pressure signal in response to the second thermal conductance component, using the different variable resistances to separate the second thermal conductance component from the total thermal conductance by extrapolating the total thermal conductance in the absence of the legs component.

In any of the aspects discussed herein, the micro-fabricated device may comprise a further sensing component having an output signal the integrity of which is responsive to pressure. The pressure signal may be provided to signal or used as a measure of the integrity of the further sensing component output signal. In any of the aspects herein the gauges may be Pirani, thermistor or thermocouple type gauges.

These and other aspects, including storage device aspects where instructions are stored to configure execution of a method by a processing device will be apparent to those of ordinary skill.

DESCRIPTION

The description herein is set out primarily with reference to Pirani gauges, but could be applied to other types of thermal conductivity sensors which may be useful for determining pressure, such as thermocouple gauges or thermistor gauges. Thermal conductivity gauges operate by measuring the pressure-dependent thermal conductivity of a gas. The gauge is heated, generally by Joule heating, and the temperature of the gauge depends on the amount of heat lost to its surroundings. The main sources of heat loss are solid conduction from the gauge to the structure supporting it, radiation, and gas conduction. The first two heat-loss paths remain constant with pressure, but the thermal conductivity of a gas depends on its pressure, as long as the mean free path of the gas species is greater than the typical dimension of the system. Therefore, the temperature of the gauge is related to the pressure (vacuum) level. In a Pirani gauge, the temperature is determined by measuring the resistance of the heating element itself. In a thermistor gauge, there is a separate thermistor which is used to measure the temperature of the gauge, and in a thermocouple gauge, a thermocouple junction is used to measure the temperature such as by way of a variable voltage output signal.

Further information regarding vacuum sensors (gauges) and their fabrication and use in vacuum packages is discussed in U.S. Pat. No. 7,385,199 B2, issued Jun. 10, 2008 and entitled "Microbolometer IR Focal Plane Array (FPA) with In-situ Mirco Vacuum Sensor and Method of Fabrication", which is incorporated herein by reference.

A use of micro-fabricated vacuum gauges is to integrate them with devices which need to be vacuum-packaged, such as bolometers or resonant MEMS, and use them to monitor hermeticity of the package. This is especially useful for wafer-level packaged devices, where hermeticity is a major challenge. As pressure is fixed during vacuum-packaging, subsequent non-destructive calibration against pressure is impossible, so alternative approaches must be found. The similarity between micro-fabricated Pirani vacuum gauges and micro-bolometers is well known, which makes the former particularly suited to hermeticity monitoring in bolometer dies. Pirani gauges for this application may be developed, using vanadium oxide (VOx) as the sensing material, which is the most commonly used sensing material in bolometers, due to its high temperature coefficient of resistance (TCR).

In order to facilitate the use of Pirani gauges for hermeticity monitoring, there is proposed a method of operation which does not require calibration against pressure. This approach relies on a model of the gauge and use of strategies to determine the values of unknown inputs, including combining measurements on several gauges with different geometries.

Modelling of Pirani Gauges

Figure 1:
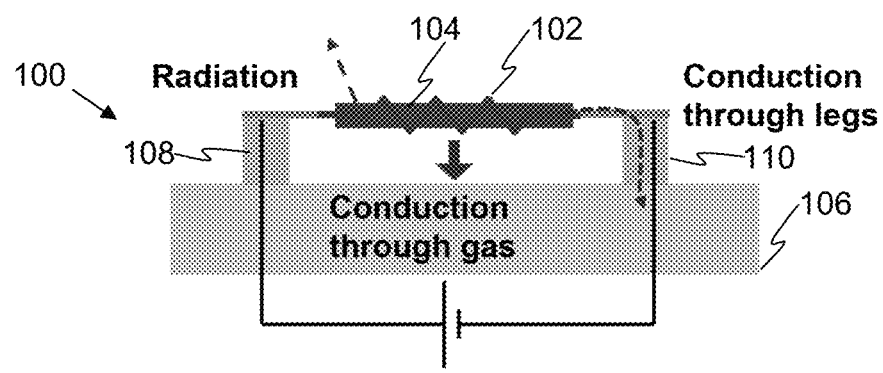
FIG. 1 is a cross-section representation of principal elements of a Pirani gauge, and the main heat-loss paths according to the prior art.

A Pirani gauge 100 is illustrated in FIG. 1 for context. Gauge 100 may comprise a VOx resistive element 102 (sensing element) deposited on top of a dielectric membrane 104, and suspended above a substrate 106 by legs 108 and 110, which also act as electrical connections and which. An electrical signal (current or voltage) is passed through the gauge 100, causing self-heating of the resistive element 102, which loses heat to its surroundings via different heat loss paths such as radiation, conduction through gas and conduction through the legs, and the electrical resistance of the gauge varies with its temperature.

Figure 2:
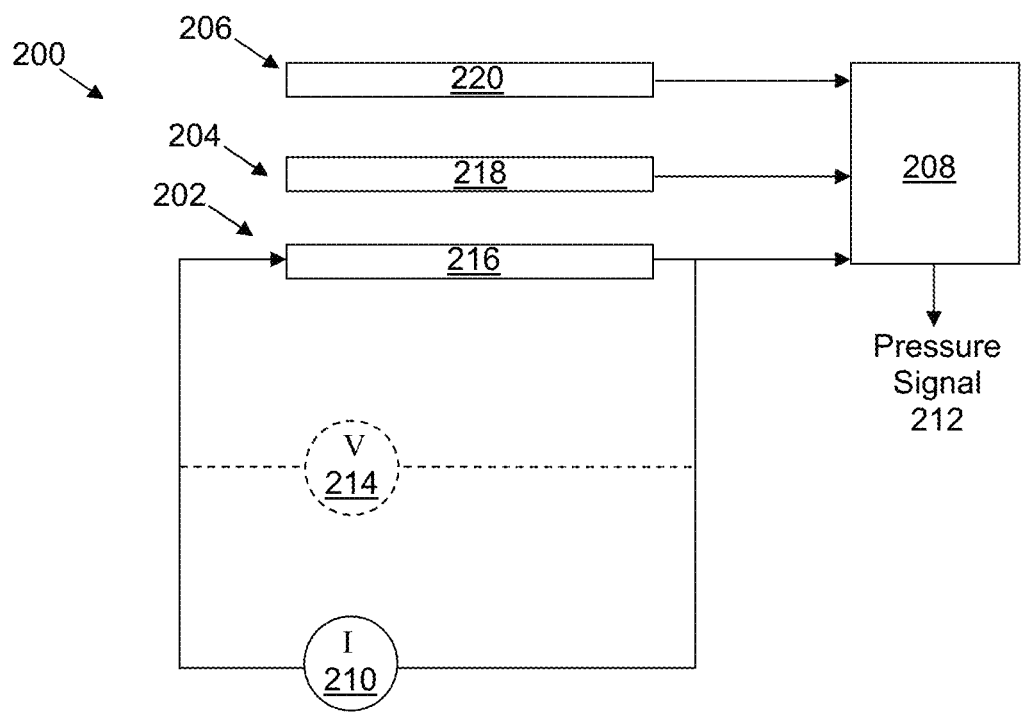
FIG. 2 is an illustration of a simplified set of vacuum gauges coupled to a pressure signal determining component in accordance with one embodiment to measure pressure in a calibration-less manner.

FIG. 2 is an illustration of a simplified micro-fabricated device 200 (e.g. a portion of vacuum package device) comprising a plurality of vacuum gauges 202, 204 and 206 coupled to a pressure signal determining component 208 in accordance with one embodiment to measure pressure in a calibration-less manner. Vacuum gauges 202, 204 and 206 may be configured with respective ROICs (read out integrated circuits) as shown and/or output pins or other couplings to provide measurements for processing. Component 208 incorporates functionality which models the gauges, determining values of unknown inputs including combining measurements from the several gauges each having different geometries to determine a pressure signal 212. Component 208 may be configured on-board (i.e. along with the gauges of a chip/MEMS die) as a circuit(s) (e.g. ROIC) or may be a separate device (processing component) coupled to receive the measurement outputs of gauges 202, 204 and 206. Component 208 may be a computer having one or more micro-processors such as a laptop, workstation or dedicated device for a piece of equipment, etc., capable of receiving the measurements from gauges 202, 204 and 206 and determining pressure as described herein. Component 208 may be a field programmable gate array (FPGA), application-specific integrated circuit (ASIC) or other hardware component capable of receiving the measurements from gauges 202, 204 and 206 and determining pressure as described herein. Component 208 may be configurable using software (instructions) stored in a storage device (not shown) such as a memory to configure execution/operation of the component 208. Component 208 may also be configured to apply or invoke the application of the electrical signals to the gauges 202, 204 and 206 and/or to display or otherwise provide (e.g. communicate to another device) or use the pressure signal.

Vacuum gauge 202 is shown in more detail where the vacuum gauge ROIC supplies an electrical signal (e.g. current signal 210 or a voltage signal 214) that heats the resistive element (not shown) within a gauge component 216 to a temperature that is a function of vacuum level (pressure) and senses a change in voltage 214 (or current 210 if a voltage signal is used) across the sensor. The gauge component 216 is similar to that shown in FIG. 1 in that it comprises a resistive element (e.g. sensing element e.g. VOx but others may be used usch as Amorphous Silicon (a-Si)) deposited on top of a platform of dielectric membrane material ($SiO_2$ and SiN are typical materials), and suspended above a substrate by support legs. The legs also act as electrical connections. A magnitude of the change in voltage (or resistance) is assistive to measure the vacuum level as further described.

Vacuum gauge ROICs 204 and 206 comprise gauge components 218 and 220 with respective resistive elements (not shown) and it is understood that, for illustration simplicity, current and voltage aspects are not shown for vacuum gauge ROICs 204 and 206 but are similarly present as is shown for vacuum gauge ROIC 202. In accordance with aspects of the calibration-less manner, outputs from each of gauge ROICs 202, 204 and 206 are used to determine pressure signal 212. The three gauges components 216, 218 and 220 differ in configuration (geometry) as described further below, such as by having different leg lengths, so as to give different variable resistance outputs when measuring the same pressure in a same environment such as within a vacuum package of a device. It is understood that the gauges in this example are Pirani type vacuum gauges.

Figure 3:
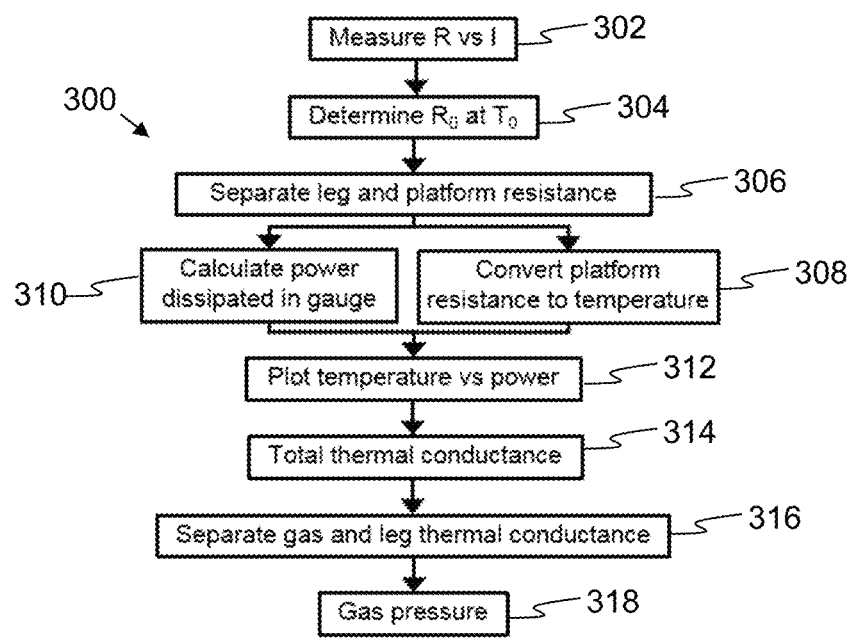
FIG. 3 is a flowchart of operations to determine pressure in a calibration-less manner in accordance with an embodiment.

The Pirani gauges may be operated by measuring I-V curves. Then several operations are performed to transform this electrical measurement to a pressure value in a calibration-less manner. FIG. 3 is a flowchart of operations 300 in accordance with an embodiment. The first step at 302 involves calculating resistance R from the current I and voltage V data. Resistance as a function of current or voltage will not be constant, due to self-heating of the gauge.

Determination of Resistance at $T_0$

At step 304, the present method determines the value of $R_0$, the resistance at ambient temperature $T_0$, which occurs in absence of self-heating. The easiest way to obtain $R_0$ is simply to reduce bias current or voltage until self-heating becomes negligible. However, in some cases, especially under high vacuum when the thermal conductance of the gauge is low, this may require very small currents or voltages which the measurement instrument is incapable of providing. An alternative approach may be taken as follows. The proposed Pirani gauges (e.g. 202, 204 and 206) use Vanadium Oxide (VOx) as a sensing material, and its resistance, $R_{VOx}$, can be described by the following equation:

$$R_{VOx} = A_R \exp\left(\frac{E_a}{k_B T}\right) \quad (1)$$

where $A_R$ is an exponential prefactor, $E_a$ is the activation energy, $k_B$ the Boltzmann constant, and T temperature. This equation can be reorganized as follows:

$$R_{VOx} = A_R \exp\left(-\frac{E_a}{k_B T_0^2}\left(-\frac{T_0^2}{T}\right)\right) \quad (2)$$
$$= A_R \exp\left(\alpha\left(-\frac{T_0^2}{T}\right)\right)$$

where $\alpha$ is the temperature coefficient of resistance (TCR) of VOx. This expression can be reorganized further to be expressed as a function of $\Delta T = T - T_0$:

$$R_{VOx} = R_{VOx,0} \exp\left(\frac{\alpha \Delta T T_0}{T_0 + \Delta T}\right) \quad (3)$$

The temperature rise can be related to the total thermal conductance of the gauge, $G_{th}$, and the heat dissipated in the gauge, $P_h$, by $\Delta T = P_h/G_{th}$. By combining this with (3) and plotting resistance as a function of power, we have:

$$\log(R_{VOx}) = \log(R_{VOx,0}) + \frac{\alpha \frac{P_h}{G_{th}} T_0}{T_0 + \frac{P_h}{G_{th}}} \quad (4)$$

When $\Delta T \ll T_0$, this can be approximated by:

$$\log(R_{VOx}) = \log(R_{VOx,0}) + \alpha \frac{P_h}{G_{th}} \quad (5)$$

So in other words, when the dissipated power and self-heating are small, the logarithm of resistance as a function of power is linear, and the intercept for zero power gives $\log(R_{VOx,0})$.

If the measured resistance includes non-negligible contact and lead resistances, $R_{const}$, then, assuming they have a small TCR compared to that of VOx, the total resistance is $R_{Tot} = R_{const} + R_{VOx}$. Following some additional calculations, we can again show that the logarithm of total resistance is a linear function of power when $\Delta T$ is small:

$$\log(R_{Tot}) = \log(R_{const} + R_{VOx,0}) + \frac{R_{VOx,0}}{R_{VOx,0} + R_{const}} \alpha \frac{P_h}{G_{th}} \quad (6)$$

Figures 4A, 4B:
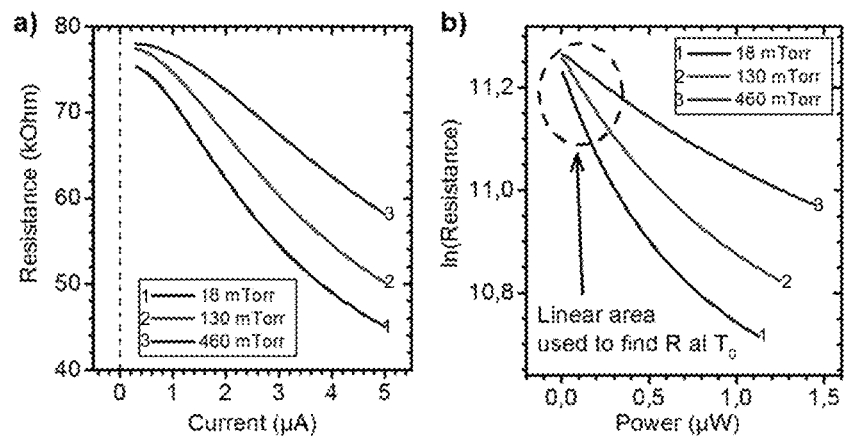
FIGS. 4A and 4B are graphical representations of a) gauge resistance as a function of current for a Pirani gauge at three different pressures and b) the same data plotted as a logarithm of resistance versus power, used to find resistance at $T_0$.

To illustrate the foregoing, FIGS. 4A and 4B are graphical representations of a) gauge resistance as a function of current for a Pirani gauge at three different pressures and b) the same data plotted as a logarithm of resistance versus power, used to find resistance at $T_0$.

The above equations apply to semiconducting materials such as VOx. However, if the sensing material is metallic, then the resistance varies linearly with temperature, and extrapolation to obtain $R_0$ in this case is trivial.

Separation of Sensor and Leg Resistance

At step 306, operations separate sensor and leg resistance. As noted above, micro-fabricated Pirani gauges are commonly designed as a membrane supporting the sensing element, and the membrane is suspended by two legs. The lower measurement limit of the gauge can be extended by reducing the thermal conductance of the legs as much as possible, that is, by making them long, narrow, and thin. This will also cause the leg to have greater electrical resistance, which may not be negligible compared to that of the actual sensor on the suspended platform. However, the value of the sensor resistance must be extracted from the measured total resistance in order to calculate pressure.

Figure 5:
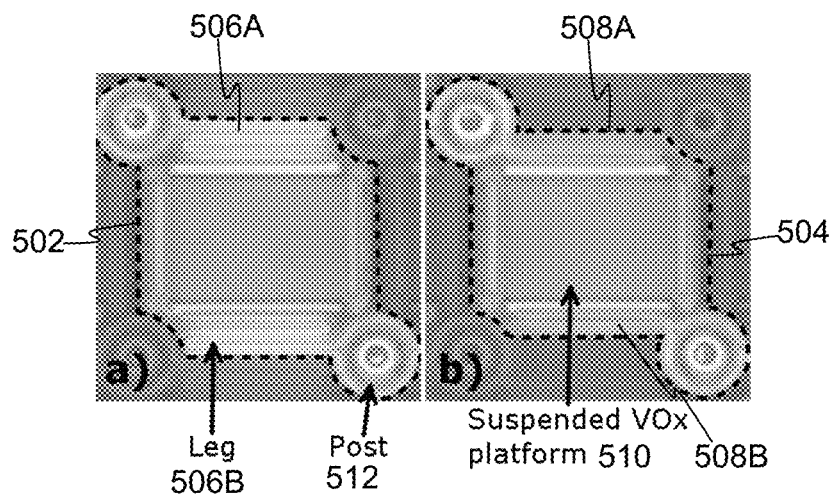
FIG. 5 is a top view of two representative vacuum gauges with different leg lengths.

To assist with the determination of the sensor resistance, several different gauges with identical platforms but different leg lengths may be employed. Other gauge geometries and options are discussed below. FIG. 5 shows an example (i.e. an optical microscopic image) of two representative gauges 502 and 504, which have been fabricated with different leg lengths. The gauges 502 and 504 were made using an industrial fabrication process on 200 mm wafers. Legs 506A and 506B are of a same long length and legs 508A and 508B are of a same short length compared to the other pair of legs. Legs 508A and 508B support a VOx platform 510 having a sensing element while the other legs 506A and 506B support a VOx platform and respective sensing element of the other gauge 502. FIG. 5 also shows posts for the gauges 502 and 504 such as post 512.

Figures 6A, 6B:
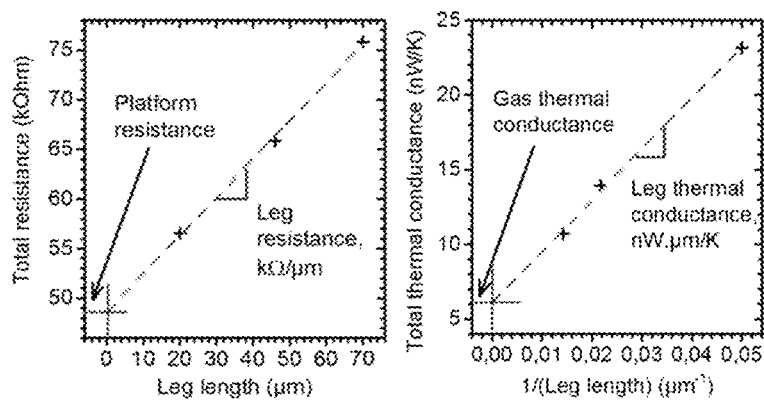
FIGS. 6A and 6B are graphical representations of a) gauge resistance as a function of leg length for three gauges with different leg lengths where the line is extrapolated to extract the resistance of the gauge platform and b) gauge resistance as a function of reciprocal of leg length where the line is extrapolated to extract the thermal conductance of the gas.

A plot of total resistance as a function of leg length will be linear, and the intercept for zero-length will give the resistance of the sensing element on the platform. Combining several gauges (e.g. three) in a package in this manner means that the electrical resistance and geometry of the legs need not be known accurately in order to measure pressure. This method is illustrated graphically in FIG. 6A. FIG. 6A is a graphical representation of measured gauge resistance as a function of leg length for three gauges with different leg lengths where the line is extrapolated to extract the resistance of the gauge platform. The leg lengths may be known from design specifications and used to make the plot. While three gauges are used, it is understood that as few as two may be used, though results may not be as accurate, and more than three may be used, which may improve accuracy.

Calculation of Sensor Temperature

At 308 operations convert the platform (sensor) resistance to a temperature measure. If the sensing material is a semiconductor such as VOx, then it can be obtained by reorganizing eq. (3), such as:

$$\Delta T = \frac{1}{\frac{\alpha}{\ln\left(\frac{R_{VOx}}{R_{VOx,0}}\right)} - \frac{1}{T_0}} \quad (7)$$

If the resistance of the sensing material varies linearly with temperature, then the temperature rise can be calculated using:

$$\Delta T = \frac{1}{\alpha}\left(\frac{R}{R_0} - 1\right) \quad (8)$$

Both equations (7) and (8) require knowledge of the sensing material TCR. This value must be determined, but unlike calibration against pressure, this can be carried out non-destructively after vacuum packaging. It is understood that for temperature sensing elements (i.e. gauges) that output voltage (a signal other than resistance) that another material property coefficient relating temperature to the signal (e.g. temperature to voltage) is needed.

Calculating Dissipated Power and Thermal Conductance

Returning to FIG. 3, at 310, the power dissipated in the gauge is calculated. At 312, temperature ($\Delta T$) versus dissipated power is plotted (e.g. evaluated). At 314, total thermal conductance is determined. The power dissipated in the sensing platform of the gauge is given by $P_h = R_{VOx} I^2$. As mentioned herein, the temperature rise of the platform is related to the dissipated power by $\Delta T = P_h/G_{th}$, where $G_{th}$ is the total thermal conductance of the gauge. Radiative heat-loss is generally neglected, so the main components of $G_{th}$ are the thermal conductance of the surrounding gas, $G_{gas}$, and the thermal conductance of the legs supporting the platform, $G_{legs}$. In the literature the thermal conductance of the legs is simply described as, $G_{legs} = \kappa(s/l)$ where $\kappa$ is the thermal conductivity of the leg material, s the section of the legs (e.g. width by thickness), and l the leg length. However, heat is also generated in the legs, and when their resistance is too large to be neglected, then the effect of the heat dissipated in the legs must also be included. By solving the heat equation describing conduction along the leg and heat generation within the leg, it can be shown that:

$$\Delta T = \frac{1}{G_{legs}}\left(\frac{P_{leg}}{2} + P_{cond}\right) \quad (9)$$

where $P_{leg}$ is the power dissipated in the legs, and $P_{cond}$ the heat flux from the sensing platform entering the legs. The power balance of the system shows that $P_h = P_{cond} + P_{gas}$ and the latter term is given by $P_{gas} = \Delta T G_{gas}$. By substituting equation (9), we obtain the following relation:

$$P_h + \frac{P_{legs}}{2} = \Delta T (G_{gas} + G_{legs}) \quad (10)$$

The previous relation shows that there is a linear relation between the temperature rise of the sensing platform and $P_h + (P_{legs}/2)$. The slope of this line gives the total thermal conductance of the vacuum gauge. The slope is the reciprocal of total thermal conductance. The total thermal conductance contains both the thermal conductance of the surrounding gas, which is pressure-dependent, and also the thermal conductance of the legs supporting the platform, which is constant.

Separate Gas and Leg Thermal Conductance

At 316 operations separate gas and leg thermal conductance from the total thermal conductance. Pressure is related to the gas thermal conductance, which is extracted from the total thermal conductance. This could be achieved by calculating and subtracting leg thermal conductance. But knowledge of the thermal conductivity of the materials in the legs is needed, which may not be well characterized. An approach similar to that used to separate the sensor resistance from the total resistance can be used. On a plot of thermal conductance versus the inverse of leg length, the intercept with the y-axis (i.e. for an infinitely long leg with zero thermal conductance) will yield the thermal conductance of the gas as shown in FIG. 6B. Hence extrapolation to x=0 yields the value of $G_{gas}$. FIG. 6B graphically illustrates gauge resistance as a function of reciprocal of leg length where the line is extrapolated to extract the thermal conductance of the gas. As with the separation of the electrical resistance values for the platform and legs, using this method means that it is not required to have accurate values of the thermal conductivity of the materials in the legs or of their geometry.

Determine Gas Pressure

At 318, operations determine the gas pressure in relation to the gas thermal conductance. There are several known models in the literature (referenced herein above) which can be used to relate the thermal conductance of a gas to its pressure, or alternatively this can be reliably calibrated on a small number of dies, given that the geometries involved are generally large and less sensitive to process variations, and that gas conductance has only a very weak dependence on material properties.

Other Sensor Configurations

Other gauge designs could also be used to implement this method. For example, an aspect of the support structure (e.g. either platform size or legs size) may be varied among each of the several gauges so that each has a different geometry. For convenience it is easier to vary a common (shared) aspect (e.g. the same aspect among all of the sensors, especially when the gauges are of the same type). That is, when separating leg and platform resistance from the total resistance, instead of using a constant platform area with different leg lengths, a set of gauges with constant leg lengths and different platform areas could be used. Specific operations discussed regarding variable leg lengths may be adapted for variable platform areas. For constant platform geometry, total resistance versus leg length is plotted, as indicated above. For constant leg length and varying platform geometry, total resistance versus number of squares (length-width ratio) can be plotted. The intercept of this line with the y-axis gives leg resistance (assuming small contact resistances).

While it may be convenient and simpler to design, fabricate and use gauges of a same type, (e.g. a plurality of Pirani gauges), a mix of gauge types may be used. For separating leg and platform resistance, a mix of Pirani gauges and thermistor gauges may be used. For separating leg and gas thermal conductance, a mix of Pirani, thermistor, and thermocouple gauges may be used.

Figure 7:
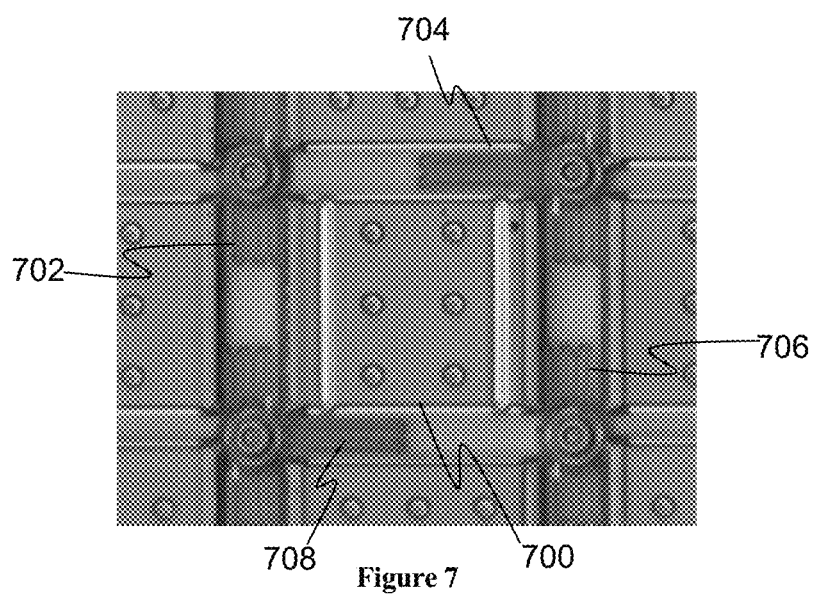
FIG. 7 is a top view of a gauge suspended by four legs, pairs of which have different lengths.

Another possible design is shown in FIG. 7 where a gauge 700 is suspended by four legs 702, 704, 706 and 708, which can be used to do 4-wire measurements of the gauge 700 and thus measure the platform resistance directly. Two of the legs 702 and 706 are of a same short length and two 704 and 708 are of a same long length.

While the examples herein have primarily referenced Pirani gauges, and VOx resistive elements, other gauge types such as thermistors having a heating element and resistive element or a thermocouple having a thermocouple junction may be employed. Heating of the resistive element in a thermistor is indirect, via the heating element, whereas it is direct in a Pirani gauge. Generally then, these gauge define or comprise a temperature sensing element having a resistive element or thermocouple junction that changes its output (e.g. resistance or voltage respectively) in response to a change in the temperature of the resistive element or thermocouple junction. There is a support structure coupled to suspend the sensing element on the support platform above and in thermal isolation from the substrate. The temperature sensing element has electrical connectivity (often through (a pair of) legs of the support structure) to receive an electrical signal that heats, directly or indirectly, the resistive element or the thermocouple junction to a temperature that is a function of a pressure level and to output a variable signal (e.g. resistance or voltage) that is responsive to the pressure level.

In brief, in a vacuum package, each of the three vacuum sensor ROICs (or external readout circuits) will periodically source a current I and measure the voltage across the respective sensor to establish different variable resistance measures for providing to the circuit component. Other guages may output variable voltage or other responsive output signal. The circuit component receives the different output signals of each of the gauges to define respective power-response curves and fits a model to the curves to extract a thermal conductance of the plurality of gauges and relates the thermal conductance to pressure to determine a pressure signal.

The circuit component calculates an initial response (e.g. resistance) measure $R_0$ at the temperature $T_0$ in the absences of self-heating (absence of power) by extrapolating a linear relation with power (in the power-response curves) to determine $R_0$ at zero power. For sensors outputting a signal measuring resistance, this signal comprises a component for the resistive element and a component for the respective legs of the support structure. Operations separate the resistance for the sensor (resistive element), which in the example is the same for each gauge, by using total resistance measures from the three gauges as a function of the respective leg lengths. A line may be "plotted" (e.g. measurements or calculations therefrom evaluated so that the slope and intercept is determined) and the platform resistance extrapolated by applying a zero leg length to the linear equation. This platform resistance is converted to temperature using TCR knowledge and a suitable equation.

For either type of gauge/sensor, thermal conductance and pressure are then determined. For example, power dissipation in the gauge is calculated. Temperature vs. power dissipation is plotted (using a linear relationship) and total thermal conductance determined using the (reciprocal) slope of this relationship. As this total thermal conductance includes leg thermal conductance and gas thermal conductance components, the gas thermal conductance component is determined by separating out the leg thermal conductance component. Separation of the gas thermal conductance component may be determined by plotting a line for total thermal conductance as a reciprocal of leg length for the three sensors. Again, extrapolating this line to a zero leg length yields gas thermal conductance. Pressure may be calculated by converting the gas thermal conductance value such as by using a suitable model or by non-destructive calibration.

If the readout circuit of the component 208 is integrated in the package (e.g. in FIG. 2), no input pins are required to measure vacuum level. If the readout circuit is external or the component is itself external as a processing component then pins are required to apply the input signal current. The vacuum level may be readout (or otherwise provided) as the actual value measured by component 208. Alternately, (or in addition) component 208 may be configured to determine whether the vacuum level is within tolerance of a specified level and output a binary pressure signal 0/1 indicating whether the vacuum package device is working or not. In most applications, the vacuum level is monitored to simply determine whether the vacuum level is still good, and if not to take the device offline. It may be possible, either on chip or off, to use the measured vacuum level to recalibrate the device so it can produce usable information even in a degraded vacuum. This is probably only feasible for relatively small degradation and even at that such degradation will reduce the SNR of the device.

The gauges do not have to be in a vacuum package for operability. Pressure of a general environment (e.g. that is, at atmosphere or one not intended to be a vacuum) may be measured using the techniques and teachings herein. In a general environment, it will be understood that the existence of heat sinks around the gauge are a consideration. In the case of a vacuum package these are the substrate and the cap. For use outside a vacuum package a cap above the gauge may be required, but with openings to allow the gauge to be exposed to the pressure it should measure. The pressure-range where the gauge is sensitive depends on the geometry of the gauge, and the smaller the critical dimension of the gauge, the higher the upper measurement limit. For instance, measurements at atmospheric pressure may require a gap between membrane and substrate on the order of tens of nanometers.

Use in a vacuum package is desirable as calibration is not possible in this case. But the teachings and techniques disclosed herein could be used outside a vacuum package. In such a case time and resources to calibrate may be saved.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

The invention claimed is:

1. A micro-fabricated device comprising:
 a substrate;
 a plurality of pressure sensing gauges on said substrate, each of the gauges comprising:
  a temperature sensing element comprising a resistive element or thermocouple junction that generates an output signal responsive to a temperature of the resistive element or thermocouple junction; and
  a support structure coupled to suspend the sensing element on the support platform above and in thermal isolation from the substrate;
  wherein the sensing element having electrical connectivity to receive an electrical signal to heat, directly or indirectly, the sensing element to a temperature that is a function of a pressure level and to generate the output signal that is dependent upon the pressure level; and
  wherein the support structure for each of the plurality of gauges is configured with a different geometry so that each gauge generates a different output signal in response to a same electrical signal when measuring the same pressure level in a same environment of the micro-fabricated device.

2. The micro-fabricated device of claim 1 wherein the support structure comprises a support platform and support legs and wherein the different geometry comprises one of:
 varying a geometry of the support platform among each of the gauges while keeping the geometry of the support legs identical; and
 varying a geometry of the support legs among each of the gauges while keeping the geometry of the support platform identical.

3. The micro-fabricated device of claim 1 comprising a component configured to receive each different output signal to define respective power-response curves and fit a model to the curves to extract a thermal conductance of the plurality of gauges and relate the thermal conductance to pressure to determine a pressure signal.

4. The micro-fabricated device of claim 3 wherein:
 the gauges comprise resistive elements;
 each different output signal comprises a respective measure of total variable resistance for a respective gauge and each total variable resistance comprises measures of a leg resistance and a resistive element resistance; and
 the model uses each different output signal to separate the leg resistance and the resistive element resistance and determine a temperature that is responsive to the resistive element resistance.

5. The micro-fabricated device of claim 3 wherein the model determines an initial response ($R_0$) and temperature ($T_0$), at an ambient temperature in the absence of heating the sensing element, by extrapolating the power-response curves at zero power.

6. The micro-fabricated device of claim 5 wherein, for a temperature sensing element comprising a resistive element that generates an output signal measuring resistance, the model determines a change in temperature $\Delta T$ relative to $T_0$ in accordance with the equation:

$$\Delta T = \frac{1}{\dfrac{\alpha}{\ln\left(\dfrac{R_{SE}}{R_{SE,0}}\right)} - \dfrac{1}{T_0}}$$

where $R_{SE}$ is a measure of the sensing element output signal when heated, $R_{SE,0}$ is the initial sensing element response at $T_0$ and $\alpha$ is the temperature coefficient of resistance (TCR) of a material of the sensing element.

7. The micro-fabricated device of claim 3 wherein the model determines total thermal conductance as a function of a temperature of the sensing element and power dissipated in each gauge.

8. The micro-fabricated device of claim 7 wherein the model uses the different output signals to separate a leg thermal conductance and a gas thermal conductance from the total thermal conductance and determine the pressure signal in response to the gas thermal conductance; wherein the leg thermal conductance is a measure of conductance through a leg portion of the support structure supporting the sensing element above the substrate; and wherein the gas thermal conductance is a measure of conductance through a gas around the sensing element of each gauge.

9. The micro-fabricated device of claim 8 wherein the model extrapolates a relationship between the total thermal conductance and a length of the leg portion of the support structure to determine thermal conductance in the absence of the leg portion.

10. The micro-fabricated device of claim 1 wherein the gauges are configured to determine a level of vacuum in a vacuum package of the micro-fabricated device.

11. A pressure determining device configured to:
receive different output signals defining respective power-response curves, where the different output signals are received from a plurality of temperature sensing gauges on a substrate of a micro-fabricated device, each of the gauges comprising:
   a sensing element comprising a resistive element or thermocouple junction that generates an output signal responsive to a temperature of the resistive element or thermocouple junction which temperature is responsive to a pressure level; and a support structure coupled to suspend the sensing element on the support platform above and in thermal isolation from the substrate; and
   wherein the support structure for each of the plurality of gauges is configured with a different geometry so that each gauge generates a different output signal in response to a same electrical signal when measuring the same pressure in a same environment;
fit a model to the curves to extract a thermal conductance of the plurality of gauges and relate the thermal conductance to determine a pressure signal.

12. The pressure determining device of claim 11 wherein:
the gauges comprise resistive elements;
the different output signal from each gauge comprises a measure of total variable resistance for the gauge and each total variable resistance comprises measures of a leg resistance and a resistive element resistance; and
the model uses each different output signal to separate the leg resistance and the resistive element resistance and determine a temperature that is responsive to the resistive element resistance.

13. The pressure determining device of claim 11 wherein the model determines an initial response ($R_O$) and temperature ($T_O$), at an ambient temperature in the absence of heating the sensing element, using a linear relationship between power and the output signal generated in response and extrapolating the relationship to zero power.

14. The pressure determining device of claim 13 wherein, for a temperature sensing element comprising a resistive element that generates an output signal measuring resistance, the model determines a change in temperature $\Delta T$ relative to $T_0$ in accordance with the equation:

$$\Delta T = \frac{1}{\frac{\alpha}{\ln\left(\frac{R_{SE}}{R_{SE,0}}\right)} - \frac{1}{T_0}}$$

where $R_{SE}$ is a measure of the sensing element output signal when heated, $R_{SE,0}$ is the initial sensing element response at $T_0$ and $\alpha$ is the temperature coefficient of resistance (TCR) of a material of the sensing element.

15. The pressure determining device of claim 11 wherein the model determines total thermal conductance as a function of a temperature of the sensing element and power dissipated in each gauge.

16. The pressure determining device of claim 15 wherein the model uses the different output signals to separate a leg thermal conductance and a gas thermal conductance from the total thermal conductance and determine the pressure signal in response to the gas thermal conductance; wherein the leg thermal conductance is a measure of conductance through a leg portion of the support structure supporting the sensing element above the substrate; and wherein the gas thermal conductance is a measure of conductance through a gas around the sensing element of each gauge.

17. The pressure determining device of claim 16 wherein the model extrapolates a relationship between the total thermal conductance and a length of the leg portion of the support structure to determine thermal conductance in the absence of the leg portion.

18. The pressure determining device of claim 11 wherein the device is one of a) separate processing device in communication with a micro-fabricated device comprising the substrate and plurality of gauges and b) a component of the micro-fabricated device.

19. The pressure determining device of claim 18 wherein the micro-fabricated device comprises a further sensing component having an output signal the integrity of which is responsive to pressure and wherein the pressure determining device is configured to provide the pressure signal to signal the integrity of the output signal of the further sensing component.

20. The pressure determining device of claim 11 wherein the gauges are configured to determine a level of vacuum in a vacuum package of a micro-fabricated device.

21. A method for a processing component comprising:
applying same electrical signals to several pressure gauges of a same gauge type co-located in a same micro-fabricated device, each gauge having a sensing element and a support structure supporting the sensing element, a geometry of the support structure varied among all of the several gauges so that each gauge generates a different output signal in response to a same pressure level in a same environment of the micro-fabricated device;
receiving the different output signal of each of the gauges to define respective power-response curves;
extracting from the curves a thermal conductance of the plurality of gauges; and
relating the thermal conductance to pressure to determine a pressure signal.

22. The method of claim 21 wherein extracting comprises:
determining an initial response measure $R_0$ at a temperature $T_0$ of the gauges by extrapolating the power-response curves at zero power, where $T_0$ is an ambient temperature in the absence of power heating the gauges;
determining a response measure of the gauges after heating by the electrical signals, each response measure including a) a response measure component from a resistive element or thermocouple junction of the sensing element and b) a response measure component from the support structure;
determining a measure of change in temperature $\Delta T$ relative to $T_0$ and a measure of power dissipated in the gauge, separating and converting the response measure component from the resistive element or thermocouple junction to determine the $\Delta T$;
determining total thermal conductance as a function of dissipated power where total thermal conductance includes a) a first thermal conductance component responsive to conductance through a legs component of the support structure of the gauge and b) a second thermal conductance component responsive to conductance through a gas around the gauge; and
determining a pressure signal in response to the second thermal conductance component, using the different variable resistances to separate the second thermal conductance component from the total thermal conductance by extrapolating the total thermal conductance in the absence of the legs component.

23. The micro-fabricated device of claim 1 wherein the plurality of gauges are selected from the group of Pirani gauges, thermistors and thermocouples.

* * * * *